(12) United States Patent
Sondrup

(10) Patent No.: US 6,381,775 B1
(45) Date of Patent: *May 7, 2002

(54) ADJUSTABLE FLOOR DRAIN APPARATUS

(75) Inventor: Chris Sondrup, Lindon, UT (US)

(73) Assignee: C&D Innovations, L.C., Lindon, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,839

(22) Filed: Jun. 15, 2001

Related U.S. Application Data

(63) Continuation-in-part of application No. 09/587,857, filed on Jun. 6, 2000, now Pat. No. 6,269,495.

(51) Int. Cl.[7] .................................................. E03C 1/12
(52) U.S. Cl. ...................... 4/679; 4/286; 4/613; 4/695; 285/261; 285/262; 210/163
(58) Field of Search .................. 4/252.3, 252.4, 4/613, 286, 679, 680, 681, 688, 692, 695; 285/261, 262, 271; 210/163

(56) References Cited

U.S. PATENT DOCUMENTS

| 1,779,936 A | 10/1930 | Hess |
|---|---|---|
| 2,190,532 A | 2/1940 | Lukomski |
| 3,420,552 A | 1/1969 | Mork |
| 4,273,467 A | 6/1981 | Cronk |
| 4,337,005 A | 6/1982 | LeBaron |
| 4,879,771 A | 11/1989 | Piskula |
| 4,883,590 A | 11/1989 | Papp |
| 5,044,674 A | 9/1991 | Hendrickson |
| 5,366,317 A | 11/1994 | Solimar |
| 5,451,119 A | 9/1995 | Hondulas |
| 5,470,172 A | 11/1995 | Wiedrich |
| 5,496,128 A | 3/1996 | Odill |
| 5,564,855 A | 10/1996 | Anderson |
| 5,956,905 A | 9/1999 | Wiedrich |

FOREIGN PATENT DOCUMENTS

JP 6-322804 A 11/1994

Primary Examiner—Gregory L. Huson
Assistant Examiner—Tuan Nguyen
(74) Attorney, Agent, or Firm—Thorpe North & Western

(57) ABSTRACT

An adjustable drain apparatus includes a drain base received within a floor. A flange is coupled to the drain base. A ring is disposed in a flange cavity and selectively movable therein. A grate is coupled to the ring. At least one retainer is coupled to the flange to retain the ring in the flange cavity. Preferably, two opposite rings selectively secure the ring in the flange. The flange has two different orientations with respect to the drain base to selectively position the grate at two different elevations with respect to the drain base.

21 Claims, 5 Drawing Sheets

ADJUSTABLE FLOOR DRAIN APPARATUS

This application is a continuation-in-part of U.S. patent application Ser. No. 09/587,857, filed Jun. 6, 2000 now U.S. Pat. No. 6,269,495. The following related applications are currently pending, U.S. patent application Ser. No. 09/566,548, entitled "Adjustable Floor Drain Apparatus" filed on May 8, 2000; and U.S. patent application Ser. No. 09/568,300, entitled "Adjustable Pipe Connector" filed on May 9, 2000, both by the same inventor, Chris Sondrup.

BACKGROUND OF THE INVENTION

1. Field of the Invention

The present invention relates generally to drains. More particularly, the present invention relates to a drain which is adjustable in height and pitch to allow the top of the drain to conform to the pitch of a surrounding surface, such as a floor.

2. Related Art

Floor and shop drains have been known and used for many years. A floor drain in its simplest form funnels liquids from a floor surface into a drain pipe. Typically floor drains have a grate attached to their top to allow liquid to flow but to prevent larger solid objects from entering the floor drain.

Drains found in restroom facilities, showers, kitchen floors and shop floors are used to drain liquids such as shower water or waste water. The problem with prior art drains is that they are often installed in floor surfaces that are neither level, flat, nor perpendicular to the drain pipe to which the drains must connect. Drains need to be at a proper height and level with the surfaces surrounding them in order to function properly. Drains which are not properly placed relative to surrounding surfaces also can pose a safety threat. In the prior art, it has been difficult and time-consuming to properly install level drains.

As mentioned, one problem associated with the construction of floor drains is the problem of being able to align the drain and grating with the portion of the floor around it. Adjusting mechanisms have not been available to accomplish this result without inordinate trouble and expense. Often, the floor drain does not conform precisely to and is not in alignment with the top of the floor. Even the adjustable floor drains which exist do not fully meet the needs of plumbing installation professionals.

One patent which illustrates an adjustable floor drain is U.S. Pat. No. 4,883,590 to Papp. The device designed by Papp is an adjustable floor drain having an outer cylindrically shaped body with threads on the inside thereof attached to the top of a drain pipe. A cylindrical member is disposed inside of the outer body so that concrete can be poured around the cylindrical member and the concrete will not enter the outer body. An inner cylindrically shaped body having threads on the exterior thereof is provided for mating with the inside threads on the outer body whereby the inner body can be threaded into the outer body and whereby the top thereof can be adjusted up or down to conform to the height of the finished floor. A ring is adapted to engage the top of the inner body, and the ring has a partially spherical surface around the lower periphery thereof which contacts the top of the inner body, which also has a complementary shaped partial spherical surface thereon for providing a mating slidable joint between the ring and the inner body. A grate is disposed in a recess on the ring, and an optional basket strainer can be installed under the grate.

SUMMARY OF THE INVENTION

It has been recognized that it would be advantageous to develop an improved floor drain apparatus which will easily and quickly allow for vertical and angular horizontal adjustment. In addition, it has been recognized that it would be advantageous to develop an adjustable drain which is simple to use and which allows a plumbing installer to quickly and easily install a drain that is level with the surrounding surfaces.

The invention provides an adjustable drain apparatus that advantageously can be adjusted in height or elevation, and/or pitch, to be flush with a surrounding floor. The drain apparatus includes a drain base that is received within the floor and connected to plumbing. The drain base has a drain cavity. In addition, the drain apparatus includes a grate that allows fluid to flow therethrough.

In accordance with one aspect of the present invention, a flange is disposed on the drain base that advantageously has two different orientations with respect to the drain base, including lower and higher orientations. In the lower orientation, the flange extends into the drain cavity of the drain base, and the grate is disposed at a lower elevation with respect to the drain base and floor. In the higher orientation, the flange extends above the drain base, and the grate is disposed at a higher elevation. Thus, the elevation of the grate advantageously can be adjusted by orienting the orientation of the flange. The flange has a flange cavity.

The flange can include an annular plate coupled to the drain base, and a cylindrical sleeve attached to and extending from the annular plate. The flange cavity is formed in the cylindrical sleeve. Thus, the cylindrical sleeve extends into the drain cavity of the drain base when the flange is in the lower orientation, and the cylindrical sleeve extends above the drain base when the flange is in the higher orientation.

In accordance with another aspect of the present invention, a ring is disposed in the flange cavity of the flange, and advantageously is capable of tilting with respect to the drain base. The grate is coupled to the ring. Thus, the orientation or pitch of the grate can be adjusted by tilting the ring.

In accordance with another aspect of the present invention, a connector channel is coupled to and between the ring and the grate, and advantageously allows further height adjustment of the grate. The connector channel is adjustably coupled to the ring to selectively elevate the grate with respect to the drain base. Preferably, the connector channel is movably coupled to the ring, and movable with respect to the ring to adjust the elevation of the grate. The inner surface of the ring can have threads formed therein, while the outer surface of the connector channel can have threads formed thereon which mate with the threads on the inner surface of the ring. Thus, the connector channel can be adjusted to elevate the grate by rotating the connector channel with respect to the ring.

In accordance with another aspect of the present invention, one or more retainers can be used to selectively secure the ring in a fixed orientation. Preferably, upper and lower retainers are coupled to respective upper and lower ends of the flange cavity of the flange. The upper and lower retainers are adjustably coupled to the flange and contact the ring to selectively secure the ring therebetween in a fixed orientation. The cylindrical sleeve of the flange can have a threaded inner surface, while the retainers each can have a threaded outer surface which mates with the threaded inner surface of the cylindrical sleeve. Thus, the retainers can be rotated to selectively contact the ring, and secure the ring in a fixed orientation. In addition, the upper and lower retainers allow the ring to be fixed despite the orientation of the flange.

Additional features and advantages of the invention will be apparent from the detailed description which follows, taken in conjunction with the accompanying drawings, which together illustrate, by way of example, features of the invention.

DETAILED DESCRIPTION

Figure 1:
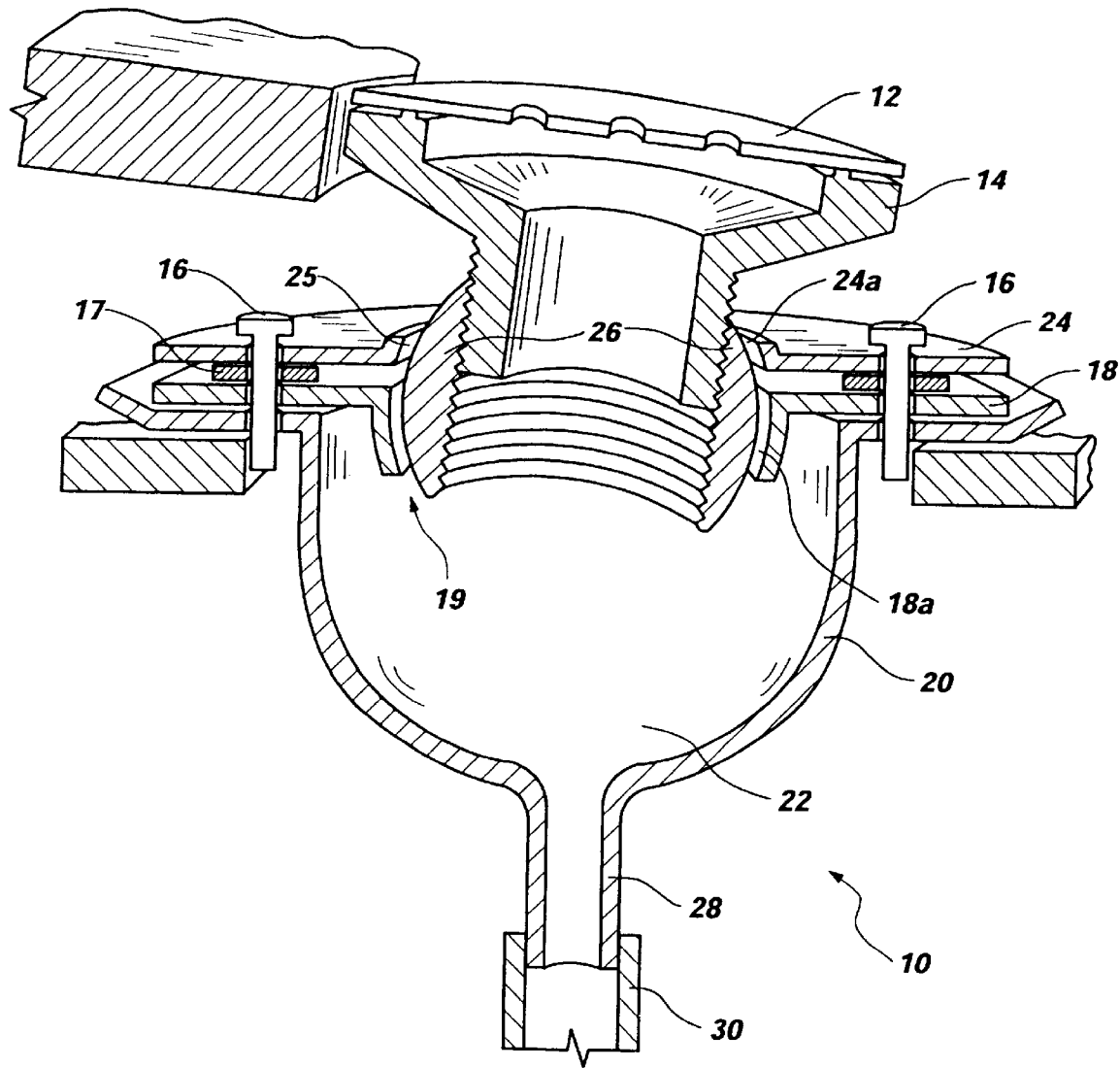
FIG. 1 is a cross-sectional perspective side view of a vertically and angularly adjustable floor drain.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Referring to FIG. 1, a cross-sectional side view of an adjustable floor drain apparatus 10 is illustrated. The apparatus 10 includes a surface grate ("grate") 12 supported by a funnel member 14 or connector channel, which mates with or threads on a rounded ring or pivot member 26. The ring 26 rests in a first plate 18 positioned about the ring. The first plate 18 has a lower substantially spherical surface 18a forming a first cavity 19 designed to mate with the spherical surface of the ring and support the ring. A drain base 20 includes a drain cavity 22, and the first plate 18 is configured to be secured to the drain base 20 and to close the drain cavity to securely hold the ring. A second plate 24 is also positioned about the ring 18, having an upper substantially spherical surface 24a forming a second cavity 25, designed to mate with the upper spherical surface of the ring 18.

The upper spherical surface 24a of the second plate 24 (which forms the second cavity 25) is used to securely hold the ring 18 against the lower spherical surface 18a. The upper spherical surface 24a should be configured such that it rests on the top portion of the ring 18 with a significant gap between the lower spherical surface 18a (and the first cavity 19) of the first plate 18. Thus, the second plate 24 is secured over the first plate 18, and both plates are secured to the base 20 using the bolts 16. Both the first and second plates 18 and 24 surround a portion of the funnel or connector channel 14, and each has holes to permit securing bolts 16 to secure the plates to the drain base 20. The drain base 20 has threads which mate with the bolts 16, and a lip 26 positioned to support the first and second plates. Washers 17 can be used to space the first and second plates apart. Although the washers 17 are optional, they are useful in providing spacing to allow the first and second plates 18 and 24 to better hold or grip the ring 18. A drain channel 28 on a lower portion of the base 20 is designed to connect to the drain pipe 30. It is further noted that the drain channel 28 can also have a pipe connected to it using a threaded connection.

Figure 2:
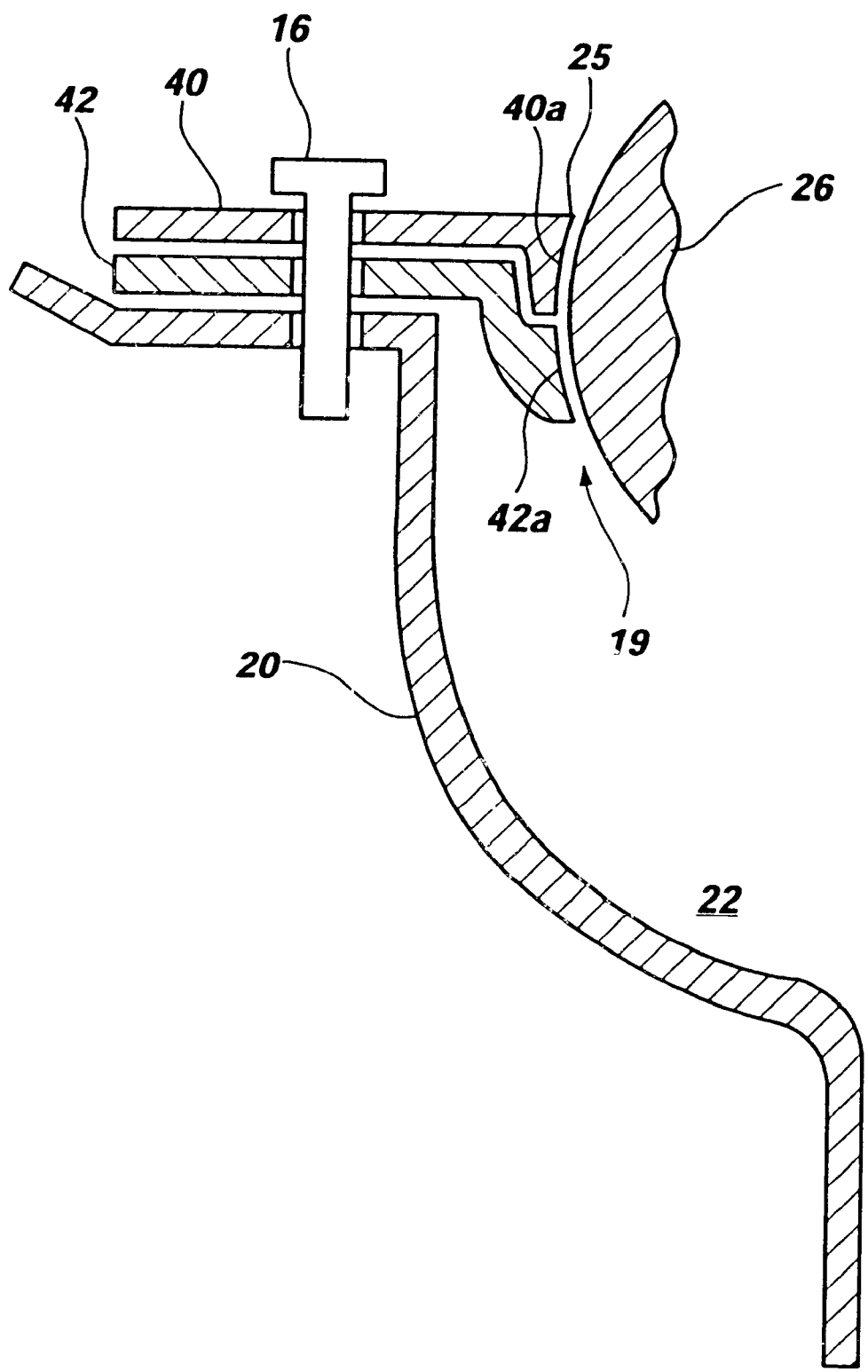
FIG. 2 is a cross-sectional orthogonal side view of a selected portion of another vertically and angularly adjustable floor drain.

FIG. 2 depicts an orthogonal cross-section side view of selected elements of one configuration of an adjustable drain. For simplicity, only the left side of the drain is shown and the right side mirrors the left side. Centerline 27 is the centerline of ring 26 when positioned level to the rest of the drain 10. The ring 26 rests in a first plate 42 which is positioned circularly about the ring 26 so that it is held rotatably therein. The first plate 42 has a lower spherical surface 42a forming a first cavity 19 designed to mate with the spherical surface of the ring 26 and support the ring. A drain base 20 includes a drain cavity 22, and the first plate 42 is configured to be secured to the drain base 20 and to close the drain cavity 22 to securely hold the ring 26.

A second plate 40 also is positioned about the ring 26. The second plate 40 has an upper substantially spherical surface 40a forming a second cavity 25, designed to mate with the upper spherical surface of the ring 26. As illustrated, the second plate 40 is secured over the first plate 42, and both plates are secured to the base 20 using the bolts 16. This interlocking spherical surface configuration 40a and 42a is significant because it allows the spherical surfaces of the plates to interlock and form a strong connector or holder for the ring 26.

Figure 3:
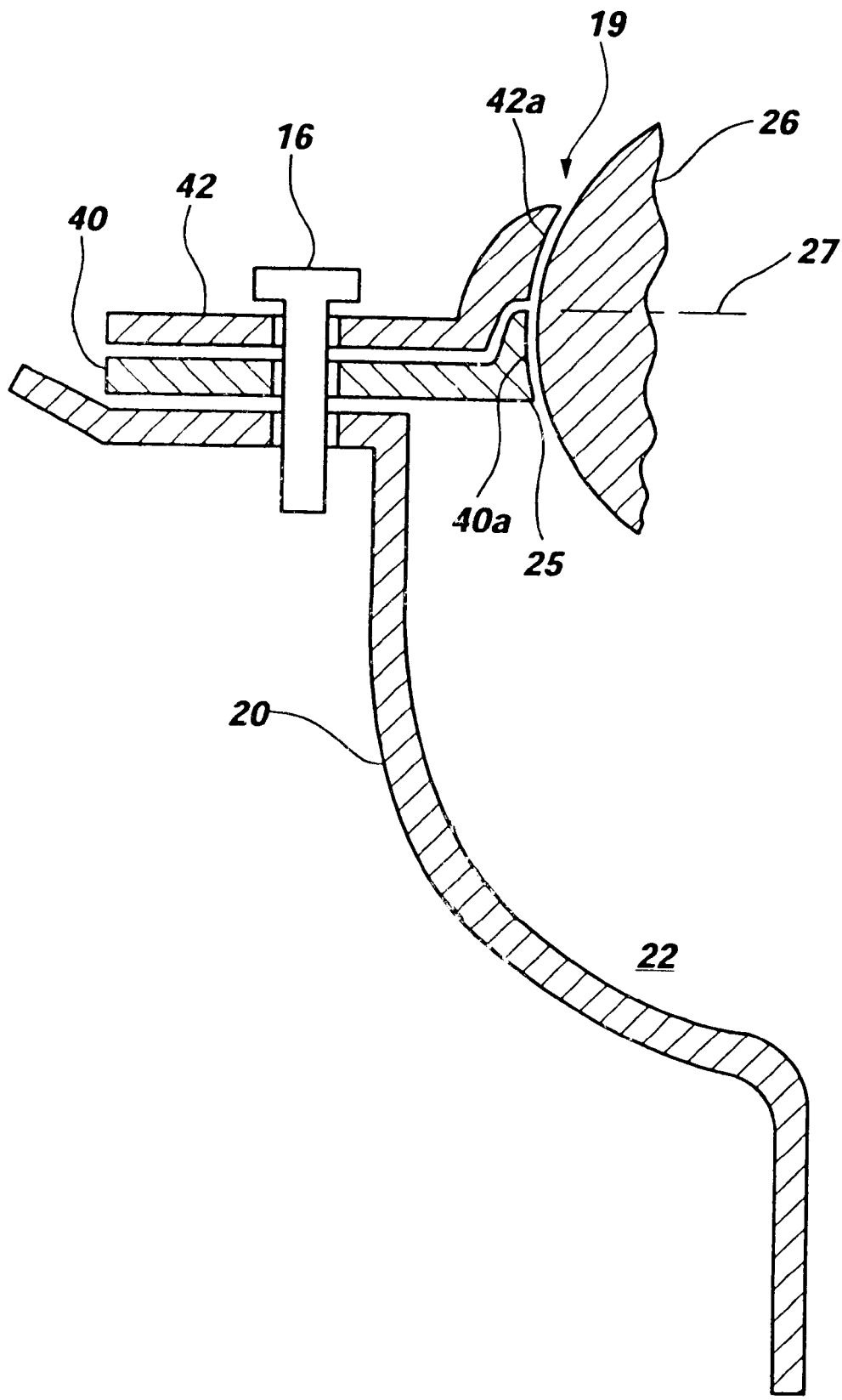
FIG. 3 is a cross sectional view of one half of another embodiment of the preferred embodiment.

FIG. 3 is a cross sectional view of one half of another embodiment of the preferred embodiment. Specifically, centerline 27 illustrates that the centerline of ring 26 is located higher relative to the base 20 than is possible in FIG. 2. Of course, one skilled in the art will realize that the size of the plates 40 and 42 can be enlarged to increase the height adjustment as a result of flipping the two plates over. This gross height adjustment is accomplished by simply flipping over the first and second plates. Again, if the plate surfaces 40a and 42a are made larger, the height difference would much larger by simply flipping over the plate arrangements.

It is noted that in all designs of the preferred embodiments, the drain apparatus 10 has the ring 26 suspended above the surface 22 of the base 20. This is needed since many commercial bases are made of material that is often rough on the surface 22. The typical rough surface 22 would prevent ring 26 from smoothly rotating in adjusting grate 12. Thus, a skilled plumbing designer will appreciate the fact that the plates 40 and 42 and the ring 26 can be made of material that allow for smooth rotation or adjustment without having to rub against the rough base surface 22.

One skilled in the art would be capable of making many obvious design changes which would stay within the scope of the invention disclosed in this application. One such change would be to vary the size or scale of components such as the surface grate, funnel member, bolts, ring, drain base, first plate, and second plate used in the apparatus.

It would be obvious to one skilled in the art to use a securing means other than threads on the funnel member and on the ring pivot member to affix the two parts. For example, adhesives or glues also could be used, while still allowing for vertical and pitch adjustment of the drain.

The first plate and second plate can be fused together to create just one plate with a partially spherical inner edge to mate with the ring. This configuration allows the ring to be either permanently held within the inner edge or snapped into the inner edge before the drain is installed.

Though bolts are illustrated, most any means of attaching the plate to the base will work, so long as sufficient pressure can be used to secure the ring in place to prevent unwanted rotation of the drain once installed into the floor.

Although the drain illustrates a certain surface shape, any shape drain can be used. The main advantage of the preferred embodiment is the installation of the ring to allow for angular movement or tilting. However, it is important to note that the tilting is useful to either the grate or to the drain channel. Specifically, the drain channel is not always perfectly aligned with the floor, and the ability to tilt the coupling is a great advantage and time saver. Therefore, it is contemplated to have a level grate or floor and a tilted base 20, which is the opposite of what is illustrated in FIG. 1.

Figure 4:
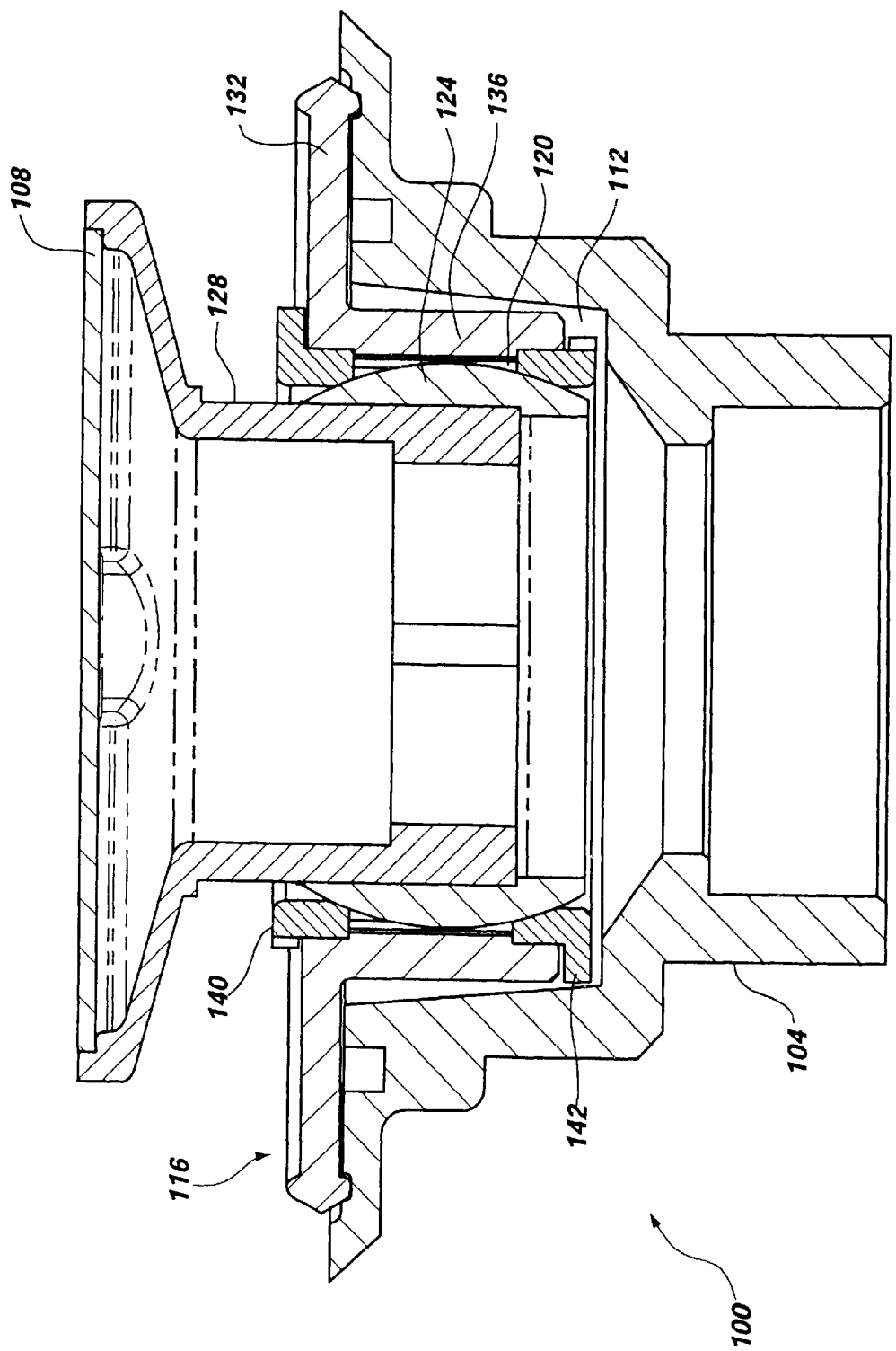
FIG. 4 is a cross sectional side view of another adjustable drain apparatus in accordance with the present invention.
Figure 5:
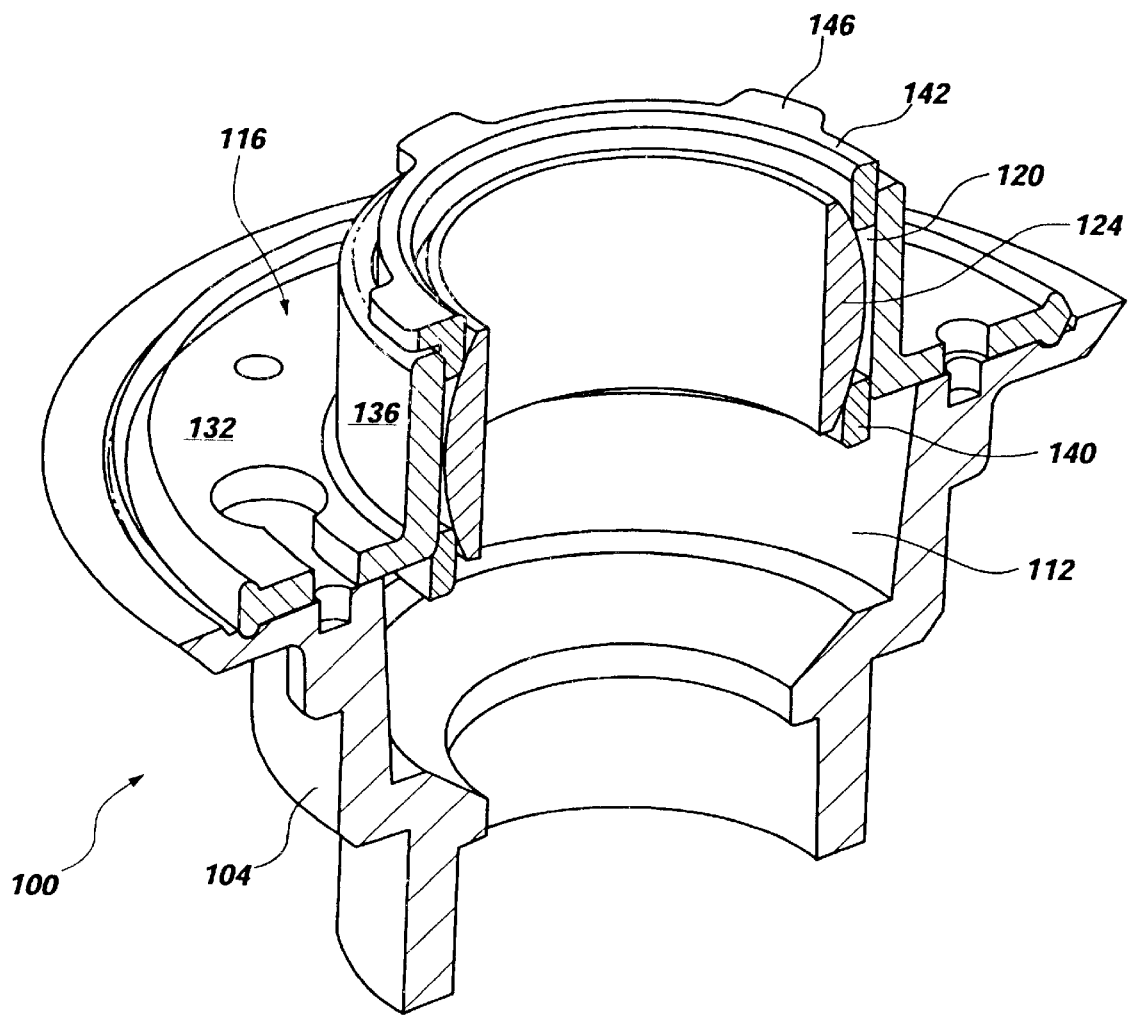
FIG. 5 is a cross sectional perspective view of a portion of the adjustable drain apparatus of FIG. 4.

As illustrated in FIGS. 4 and 5, another adjustable drain apparatus, indicated generally at 100, in accordance with the present invention is shown which is similar in many respects to those described above. The apparatus 100 includes a drain base 104 to be received within a floor, and a grate 108 configured to allow fluid to flow therethrough. In addition, the drain base 104 has a drain cavity 112.

A flange 116 is disposed on the drain base 104 and includes a flange cavity 120. The grate 108 is coupled to the flange 116. The flange 116 advantageously has two different orientations with respect to the drain base 104, including a first, lower orientation (FIG. 4), and a second, higher orientation (FIG. 5).

In the lower orientation, as shown in FIG. 4, the flange 116 extends into the drain cavity 112 of the drain base 104. In addition, the grate 108 is disposed at a lower elevation with respect to the base 104. In the higher orientation, the flange 116 extends above the drain base 104. In addition, the grate 108 is disposed at a higher elevation than the lower elevation. Thus, the flange 116 can be oriented in either the lower or higher orientation in order to locate the grate 108 a lower or higher elevation.

An adjustment ring 124 advantageously is disposed in the flange cavity 120 of the flange 116, and coupled to the grate 108. The adjustment ring 124 advantageously is capable of tilting with respect to the drain base 104 to tilt or orient the grate 108 to be flush or level with the surrounding floor.

A connector channel 128 advantageously can be coupled to and between the ring 124 and the grate 108. Preferably, the connector channel 128 is adjustably coupled to the ring 124 to selectively elevate the grate 108 with respect to the drain base 104. Thus, the height or elevation of the grate 108 can be further adjusted to be flush with the surrounding floor.

The connector channel 128 can have an upper end connected to the grate 108, and a lower end connected to the ring 124. The inner surface of the ring 124 can be threaded with female screw threads, while the outer surface of the connector channel 128 is threaded with mating male screw threads. Thus, the height of the connector channel 128 and grate 108 can be adjusted with respect to the ring 124 simply by turning the connector channel 128 with respect to the ring 124.

The flange 116 can include an annular plate 132 coupled to the drain base 104, and a cylindrical sleeve 136 attached to and extending from the annular plate 132. The flange cavity 120 can be formed in the cylindrical sleeve 136. The cylindrical sleeve 136 extends into the drain cavity 112 of the drain base 104 when the flange is in the lower orientation (FIG. 4), and extends above the drain base 104 when the flange 116 is in the higher orientation (FIG. 5).

One or more retainers can be used to retain the ring 124 in the flange cavity 120, and to selectively secure the ring 124 in a desired orientation. Opposite first and second, or upper and lower, retainers 140 and 142 can be coupled to respective first and second, or upper and lower, ends of the flange cavity 120 of the flange 116. Thus, retainers 140 and 142 are located on both sides of the flange 116 to advantageously allow at least one of the retainers 140 or 142 to be accessed or engaged regardless of the orientation of the flange 116. For example, in the lower orientation of the flange 116, as shown in FIG. 4, the first or upper retainer 140 can be accessed and engaged. Alternatively, in the higher orientation of the flange 116, as shown in FIG. 5, the second or lower retainer 142 can be accessed and engaged.

Preferably, the retainers 140 and 142 are adjustably coupled to the flange 116, and can contact the ring 126, to selectively secure the ring therebetween in a fixed orientation. For example, the cylindrical sleeve 136 of the flange 116 can have a threaded inner surface with female screw threads, while the retainers 140 and 142 each have a threaded outer surface with mating male screw threads. Thus, the retainers 140 and 142 can be engaged to secure the ring 126 by rotating either retainer 140 and 142.

The retainers 140 and 142 can be rings with tabs 146 protruding therefrom to facilitate rotating the rings. As stated above, rotating either ring 140 or 142

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An adjustable drain apparatus for positioning within a surrounding floor, comprising:
    a) a grate configured to allow fluid to drain therethrough;
    b) a connector channel, having an upper end coupled to the grate, and a lower end;
    c) a ring having:
        1) an inner surface that is attached to the lower end of the connector channel, and
        2) an outer substantially spherical surface;
    d) a flange, positioned about the ring, having a cavity to receive the ring and to rotatably hold the ring therein, the grate being tiltable relative to the flange;
    e) a drain base, having a drain cavity and a cavity surface formed therein, the flange being secured to the drain base to close the drain cavity and separate the ring and connector channel from the cavity surface;
    f) the flange being designed to hold the ring in two orientations, including:
        1) a lower orientation in which the flange cavity and the ring extend into the drain cavity and the grate is disposed at a lower elevation, and
        2) a higher orientation in which the flange cavity and the ring extend above the drain base and the grate is disposed at a higher elevation.

2. An apparatus in accordance with claim 1, wherein the flange includes:
   a) an annular plate, coupled to the drain base; and
   b) a cylindrical sleeve, attached to and extending from the annular plate, the flange cavity being formed in the cylindrical sleeve, the cylindrical sleeve extending into the drain cavity of the drain base when the flange is in the lower orientation, and the cylindrical sleeve extending above the drain base when the flange is in the higher orientation.

3. An apparatus in accordance with claim 2, further comprising:
   a) upper and lower retainers, coupled to respective upper and lower ends of the flange cavity of the flange, to retain the ring in the flange cavity.

4. An apparatus in accordance with claim 3, wherein the upper and lower retainers are adjustably coupled to the flange and contact the ring to selectively secure the ring therebetween in a fixed orientation.

5. An apparatus in accordance with claim 4, wherein
   a) the cylindrical sleeve of the flange has a threaded inner surface; and
   b) the retainers each have a threaded outer surface which mates with the threaded inner surface of the cylindrical sleeve.

6. An apparatus in accordance with claim 1, wherein the connector channel is movably coupled to the ring, and movable with respect to the ring to adjust the elevation of the grate.

7. An apparatus in accordance with claim 1, wherein
   a) the inner surface of the ring has threads formed thereon; and
   b) the outer surface of the connector channel has threads formed thereon which mate with the threads on the inner surface of the ring to allow the connector channel to be adjustably coupled to the ring to selectively elevate the grate with respect to the drain base.

8. An adjustable drain apparatus for positioning within a surrounding floor, comprising:
   a) a grate configured to allow fluid to drain therethrough;
   b) a ring having:
      1) an inner surface that is attached to the lower end of the connector channel, and
      2) an outer substantially spherical surface;
   c) a flange, positioned about the ring, having a cavity to receive the ring and to rotatably hold the ring therein, the grate being coupled to the ring and being tiltable relative to the flange;
   d) a drain base, having a drain cavity and a cavity surface formed therein, the flange being secured to the drain base to close the drain cavity and separate the ring from the cavity surface; and
   e) the flange being designed to hold the ring in two orientations, including:
      1) a lower orientation in which the flange cavity and the ring extends into the drain cavity and the grate is disposed at a lower elevation, and
      2) a higher orientation in which the flange cavity and the ring extend above the drain base and the grate is disposed at a higher elevation.

9. An apparatus in accordance with claim 8, further comprising:
   a) a connector channel, coupled to and between the ring and the grate; and
   b) the connector channel being adjustably coupled to the ring to selectively elevate the grate with respect to the drain base.

10. An apparatus in accordance with claim 9, wherein the connector channel is movably coupled to the ring, and movable with respect to the ring to adjust the elevation of the grate.

11. An apparatus in accordance with claim 10, wherein
   a) the inner surface of the ring has threads formed thereon; and
   b) the outer surface of the connector channel has threads formed thereon which mate with the threads on the inner surface of the ring to allow the connector channel to be adjustably coupled to the ring to selectively elevate the grate with respect to the drain base.

12. An apparatus in accordance with claim 8, wherein the flange includes:
   a) an annular plate, coupled to the drain base; and
   b) a cylindrical sleeve, attached to and extending from the annular plate, the flange cavity being formed in the cylindrical sleeve, the cylindrical sleeve extending into the drain cavity of the drain base when the flange is in the lower orientation, and the cylindrical sleeve extending above the drain base when the flange is in the higher orientation.

13. An apparatus in accordance with claim 12, further comprising:
   a) upper and lower retainers, coupled to respective upper and lower ends of the flange cavity of the flange, to retain the ring in the flange cavity.

14. An apparatus in accordance with claim 13, wherein the upper and lower retainers are adjustably coupled to the flange and contact the ring to selectively secure the ring therebetween in a fixed orientation.

15. An apparatus in accordance with claim 14, wherein
   a) the cylindrical sleeve of the flange has a threaded inner surface; and
   b) the retainers each have a threaded outer surface which mates with the threaded inner surface of the cylindrical sleeve.

16. An adjustable floor drain apparatus, comprising:
   a) a drain base, configured to be received within a floor, having a drain cavity;
   b) a flange, coupled to the drain base, having a flange cavity;
   c) a ring, disposed in the flange cavity and selectively movable therein;
   d) a grate, coupled to the ring, configured to allow fluid to flow therethrough; and
   e) at least one retainer, coupled to the flange, to retain the ring in the flange cavity; and
   f) the retainer being adjustably coupled to the flange and contacting the ring to selectively secure the ring, and thus the grate, in a fixed orientation with respect to the drain base; and
   g) the flange having two different orientations with respect to the drain base to selectively position the grate at two different elevations with respect to the drain base, including:
      1) a lower orientation in which the flange cavity and the ring extend into the drain cavity of the drain base, and the grate is positioned at a lower elevation; and
      2) a higher orientation in which the flange cavity and the ring extend above the drain base, and the grate is positioned at a higher elevation.

17. An apparatus in accordance with claim 16, the flange including:
 1) an annular plate, coupled to the drain base; and
 2) a cylindrical sleeve, attached to and extending from the annular plate, the flange cavity being formed in the cylindrical sleeve.

18. An apparatus in accordance with claim 16, further comprising:
 a) upper and lower retainers, coupled to respective upper and lower ends of the flange cavity of the flange, to retain the ring in the flange cavity.

19. An apparatus in accordance with claim 18, wherein
 a) the cylindrical sleeve of the flange has a threaded inner surface; and
 b) the retainers each have a threaded outer surface which mates with the threaded inner surface of the cylindrical sleeve.

20. An apparatus in accordance with claim 16, further comprising:
 a) a connector channel, coupled to and between the ring and the grate; and
 b) the connector channel being adjustably coupled to the ring to adjustably couple the grate to the ring.

21. An apparatus in accordance with claim 20, wherein
 a) the inner surface of the ring has threads formed thereon; and
 b) the outer surface of the connector channel has threads formed thereon which mate with the threads on the inner surface of the ring to allow the connector channel to be adjustably coupled to the ring to selectively elevate the grate with respect to the drain base.

\* \* \* \* \*